US010219335B2

(12) United States Patent
Veskovic

(10) Patent No.: US 10,219,335 B2
(45) Date of Patent: *Feb. 26, 2019

(54) FORWARD CONVERTER HAVING A PRIMARY-SIDE CURRENT SENSE CIRCUIT

(71) Applicant: Lutron Electronics Co., Inc., Coopersburg, PA (US)

(72) Inventor: Dragan Veskovic, Allentown, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,758

(22) Filed: May 2, 2017

(65) Prior Publication Data

US 2017/0238382 A1  Aug. 17, 2017

Related U.S. Application Data

(63) Continuation of application No. 14/940,540, filed on Nov. 13, 2015, now Pat. No. 9,655,177, which is a
(Continued)

(51) Int. Cl.
*H05B 37/02* (2006.01)
*H05B 33/08* (2006.01)
(Continued)

(52) U.S. Cl.
CPC .......... *H05B 33/0815* (2013.01); *H02M 1/08* (2013.01); *H02M 3/33538* (2013.01);
(Continued)

(58) Field of Classification Search
None
See application file for complete search history.

(56) References Cited

U.S. PATENT DOCUMENTS 6,452,344 B1   9/2002  MacAdam et al.
6,982,528 B2   1/2006  Cottongim et al.
(Continued)

FOREIGN PATENT DOCUMENTS

CN    102217418 A    10/2011
TW    2009-06041 A   2/2009

*Primary Examiner* — Long Nguyen
(74) *Attorney, Agent, or Firm* — Condo Roccia Koptiw LLP

(57) ABSTRACT

A load control device for controlling the amount of power delivered to an electrical load (e.g., an LED light source) includes first and second semiconductor switches, a transformer, a capacitor, a controller, and a current sense circuit operable to receive a sense voltage representative of a primary current conducting through to a primary winding of the transformer. The primary winding is coupled in series with a semiconductor switch, while a secondary winding is adapted to be operatively coupled to the load. The capacitor is electrically coupled between the junction of the first and second semiconductor switches and the primary winding. The current sense circuit receives a sense voltage and averages the sense voltage when the first semiconductor switch is conductive, so as to generate a load current control signal that is representative of a real component of a load current conducted through the load.

24 Claims, 11 Drawing Sheets

Related U.S. Application Data continuation of application No. 13/834,153, filed on Mar. 15, 2013, now Pat. No. 9,232,574.

(60) Provisional application No. 61/668,759, filed on Jul. 6, 2012.

(51) Int. Cl.
*H02M 3/335* (2006.01)
*H02M 1/08* (2006.01)
*H02M 1/00* (2006.01)

(52) U.S. Cl.
CPC ... *H02M 3/33546* (2013.01); *H02M 3/33553* (2013.01); *H05B 33/08* (2013.01); *H05B 33/0851* (2013.01); *H02M 2001/0009* (2013.01); *Y02B 20/347* (2013.01)

(56) References Cited

U.S. PATENT DOCUMENTS

| | | |
|---|---|---|
| 7,061,191 B2 | 6/2006 | Chitta |
| 7,259,524 B2 | 8/2007 | Hausman, Jr. et al. |
| 7,432,661 B2 | 10/2008 | Taipale et al. |
| 7,489,090 B2 | 2/2009 | Taipale |
| 7,825,609 B2 | 11/2010 | Taipale et al. |
| 8,008,866 B2 | 8/2011 | Newman, Jr. et al. |
| 8,228,002 B2 | 7/2012 | Newman, Jr. et al. |
| 8,232,733 B2 | 7/2012 | Newman, Jr. et al. |
| 8,339,048 B2 | 12/2012 | Newman, Jr. et al. |
| 8,354,803 B2 | 1/2013 | Newman, Jr. et al. |
| 8,354,804 B2 | 1/2013 | Otake et al. |
| 8,384,297 B2 | 2/2013 | Quayle et al. |
| 8,466,628 B2 | 6/2013 | Shearer et al. |
| 8,492,987 B2 | 7/2013 | Nuhfer et al. |
| 8,492,988 B2 | 7/2013 | Nuhfer et al. |
| 9,232,574 B2 * | 1/2016 | Veskovic ............... H05B 33/08 |
| 9,655,177 B2 * | 5/2017 | Veskovic ............... H05B 33/08 |
| 2009/0034301 A1 | 2/2009 | Chou |
| 2010/0123404 A1 | 5/2010 | Chen et al. |
| 2010/0156319 A1 | 6/2010 | Melanson et al. |
| 2010/0244801 A1 | 9/2010 | Arora et al. |
| 2011/0034276 A1 | 2/2011 | Minarovic |
| 2011/0080110 A1 | 4/2011 | Nuhfer et al. |
| 2011/0080111 A1 | 4/2011 | Nuhfer et al. |
| 2011/0080112 A1 | 4/2011 | Shearer et al. |
| 2011/0248648 A1 | 10/2011 | Liu |
| 2011/0304276 A1 * | 12/2011 | Hariharan ......... H05B 33/0815 315/250 |
| 2011/0304280 A1 * | 12/2011 | Jin .................... H05B 41/2825 315/307 |
| 2012/0043899 A1 | 2/2012 | Veskovic |
| 2012/0043905 A1 | 2/2012 | Christensen et al. |
| 2012/0153866 A1 * | 6/2012 | Liu .................. H02M 3/33561 315/294 |
| 2012/0286681 A1 | 11/2012 | Hausman, Jr. |
| 2012/0286689 A1 | 11/2012 | Newman, Jr. et al. |
| 2013/0018522 A1 | 1/2013 | Nuhfer et al. |
| 2013/0020964 A1 | 1/2013 | Nuhfer et al. |
| 2013/0049589 A1 | 2/2013 | Simi |
| 2013/0063047 A1 | 3/2013 | Veskovic |

* cited by examiner

FORWARD CONVERTER HAVING A PRIMARY-SIDE CURRENT SENSE CIRCUIT

CROSS-REFERENCE TO RELATED APPLICATIONS

This application is a continuation of U.S. patent application Ser. No. 14/940,540, filed Nov. 13, 2015, which issued as U.S. Pat. No. 9,655,177 on May 16, 2017, which is a continuation of U.S. patent application Ser. No. 13/834,153, filed Mar. 15, 2013, which issued as U.S. Pat. No. 9,232,574 on Jan. 5, 2016, which claims the benefit of commonly-assigned U.S. Provisional Application No. 61/668,759, filed Jul. 6, 2012, entitled LOAD CONTROL DEVICE FOR A LIGHT-EMITTING DIODE LIGHT SOURCE, the entire disclosures of which are hereby incorporated by reference.

BACKGROUND

Light-emitting diode (LED) light sources (i.e., LED light engines) are often used in place of or as replacements for conventional incandescent, fluorescent, or halogen lamps, and the like. LED light sources may comprise a plurality of light-emitting diodes mounted on a single structure and provided in a suitable housing. LED light sources are typically more efficient and provide longer operational lives as compared to incandescent, fluorescent, and halogen lamps. In order to illuminate properly, an LED driver control device (i.e., an LED driver) must be coupled between an alternating-current (AC) source and the LED light source for regulating the power supplied to the LED light source. The LED driver may regulate either the voltage provided to the LED light source to a particular value, the current supplied to the LED light source to a specific peak current value, or may regulate both the current and voltage.

LED light sources are typically rated to be driven via one of two different control techniques: a current load control technique or a voltage load control technique. An LED light source that is rated for the current load control technique is also characterized by a rated current (e.g., approximately 350 milliamps) to which the peak magnitude of the current through the LED light source should be regulated to ensure that the LED light source is illuminated to the appropriate intensity and color. In contrast, an LED light source that is rated for the voltage load control technique is characterized by a rated voltage (e.g., approximately 15 volts) to which the voltage across the LED light source should be regulated to ensure proper operation of the LED light source. Typically, each string of LEDs in an LED light source rated for the voltage load control technique includes a current balance regulation element to ensure that each of the parallel legs has the same impedance so that the same current is drawn in each parallel string.

It is known that the light output of an LED light source can be dimmed. Different methods of dimming LEDs include a pulse-width modulation (PWM) technique and a constant current reduction (CCR) technique. Pulse-width modulation dimming can be used for LED light sources that are controlled in either a current or voltage load control mode. In pulse-width modulation dimming, a pulsed signal with a varying duty cycle is supplied to the LED light source. If an LED light source is being controlled using the current load control technique, the peak current supplied to the LED light source is kept constant during an on time of the duty cycle of the pulsed signal. However, as the duty cycle of the pulsed signal varies, the average current supplied to the LED light source also varies, thereby varying the intensity of the light output of the LED light source. If the LED light source is being controlled using the voltage load control technique, the voltage supplied to the LED light source is kept constant during the on time of the duty cycle of the pulsed signal in order to achieve the desired target voltage level, and the duty cycle of the load voltage is varied in order to adjust the intensity of the light output. Constant current reduction dimming is typically only used when an LED light source is being controlled using the current load control technique. In constant current reduction dimming, current is continuously provided to the LED light source, however, the DC magnitude of the current provided to the LED light source is varied to thus adjust the intensity of the light output. Examples of LED drivers are described in greater detail in commonly-assigned U.S. patent application Ser. No. 12/813,908, filed Jun. 11, 2010, and U.S. patent application Ser. No. 13/416,741, filed Mar. 9, 2012, both entitled LOAD CONTROL DEVICE FOR A LIGHT-EMITTING DIODE LIGHT SOURCE, the entire disclosures of which are hereby incorporated by reference.

In addition, some LED light sources comprise forward converters for driving the LED light sources to control the load current conducted through the LED light source. Forward converters comprise a transformer having a primary winding coupled to at least one semiconductor switch and a secondary winding operatively coupled to the LED light source. The semiconductor switch is rendered conductive and non-conductive to conduct a primary current through the primary winding and to thus transfer power to the secondary winding of the transformer. Forward converters typically comprise an optocoupler for coupling a feedback signal on the secondary side of the transformer to the primary side of the transformer, such that a controller can control the semiconductor switch is response to the feedback signal. However, there is a need for a forward converter that is able to control the magnitude of the load current through an LED light source without the need for an optocoupler.

SUMMARY

The present disclosure relates to a load control device for an electrical load, such as a light-emitting diode (LED) driver for controlling the intensity of an LED light source.

As described herein, a load control device for controlling the amount of power delivered to an electrical load may include first and second semiconductor switches, a transformer, a capacitor, a controller, and a current sense circuit. The first and second semiconductor switches electrically coupled in series and configured to be controlled to generate an inverter voltage at a junction of the first and second semiconductor switches. The transformer may include a primary winding coupled between circuit common and the junction of the first and second semiconductor switches. The transformer may include a secondary winding adapted to supply current to the electrical load. For example, the transformer may be configured to transfer power to the secondary winding when either of the first and second semiconductor switches is conductive. The first and second semiconductor switches and the transformer may be part of an isolated forward converter. The converter may be configured to receive a bus voltage and to conduct a load current through the electrical load.

The capacitor may be electrically coupled between the junction of the first and second semiconductor switches and the primary winding of the transformer to cause a primary voltage across the primary winding to have a positive polarity when the first semiconductor switch is conductive and a negative polarity when the second semiconductor switch is conductive. The controller may be configured to control the first semiconductor switch to control a load current conducted through the electrical load. The controller may be further configured to control the amount of power delivered to the electrical load to a target amount of power.

The current sense circuit may be configured to receive a sense voltage representative of a magnitude of a primary current conducted through the primary winding. The current sense circuit may include an averaging circuit configured to average the sense voltage when the first semiconductor switch of the isolated forward converter is conductive to generate a load current control signal that is representative of a real component of the primary current. The current sense circuit may be configured to average the sense voltage for an on time when the first semiconductor switch of the isolated forward converter is conductive plus an additional amount of time to generate a load current control signal that is representative of a real component of the primary current. The additional amount of time may be included when the target amount of power described herein is less than a threshold amount. The duration of the additional amount of time may be a function of the target amount of power (e.g., the additional amount of time may increase linearly as the target amount of power decreases).

An LED driver for controlling the intensity of an LED light source is also described herein. The LED driver may include a transformer, a controller, and a current sense circuit. The transformer may include a primary winding and a secondary winding adapted to supply current to the LED light source. The controller may be configured to control a load current conducted through the LED light source to control the intensity of the LED light source to a target intensity. The LED driver may also include an isolated forward converter that may be configured to receive a bus voltage and to conduct a load current through the LED light source. The isolated forward converter may include the transformer and a half-bridge inverter circuit for generating an inverter voltage. The half-bridge inverter circuit may be coupled to the primary winding of the transformer through a capacitor to produce a primary voltage across the primary winding. The controller may be configured to control the half-bridge inverter circuit of the isolated forward converter so that the load current conducted through the LED light source may be controlled. The intensity of the LED light source may also be controlled to reach a target intensity. The current sense circuit may be configured to receive a sense voltage representative of a magnitude of a primary current conducted through the primary winding. The current sense circuit may be further configured to average the sense voltage when the magnitude of the primary voltage across the primary winding is positive and greater than approximately zero volts. A load current control signal that is representative of a real component of the primary current may be generated as a result.

Also described herein is a forward converter for controlling the amount of power delivered to an electrical load from an input voltage. The forward converter may include a transformer, a half-bridge inverter circuit, a capacitor, a controller, and a current sense circuit. The transformer may include a primary winding and a secondary winding adapted to supply current to the electrical load. The half-bridge inverter circuit may include first and second semiconductor switches coupled in series across the input voltage and configured to generate an inverter voltage at a junction of the two semiconductor switches. The capacitor may be coupled between the junction of the two semiconductor switches and the primary winding of the transformer such that a primary voltage may be produced across the primary winding. The transformer may be further configured to transfer power to the secondary winding when either of the semiconductor switches is conductive. The controller may configured to control the first and second semiconductor switches so that a load current conducted through the electrical load may be controlled. The current sense circuit may be configured to receive a sense voltage representative of a magnitude of a primary current conducted through the primary winding. The current sense circuit may be configured to average the sense voltage when the first semiconductor switch of the half-bridge inverter circuit is conductive. A load current control signal that is representative of a real component of the load current may be generated as a result.

Other features and advantages of the present invention will become apparent from the following description of the invention that refers to the accompanying drawings.

DETAILED DESCRIPTION

Figure 1:
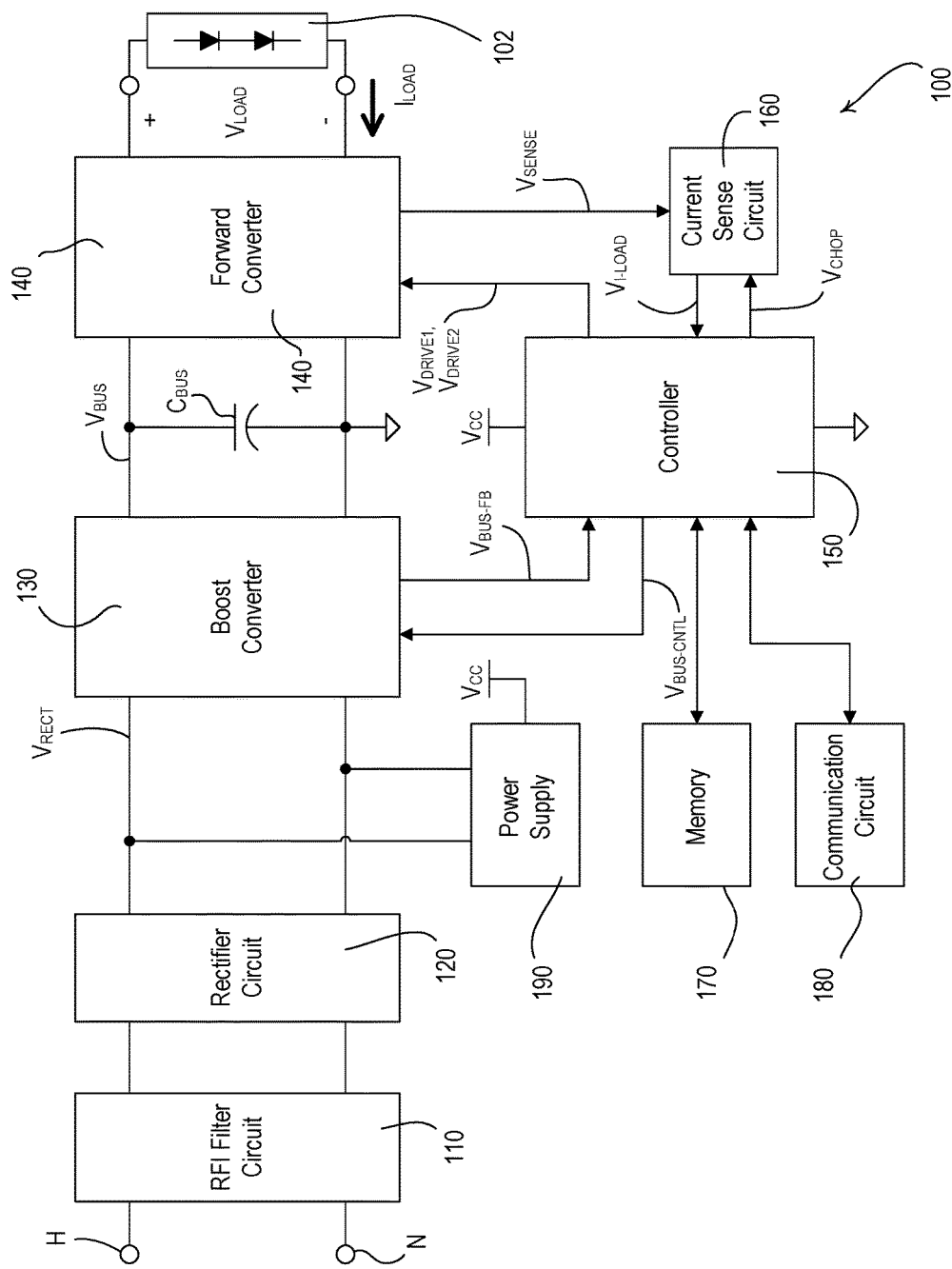
FIG. 1 is a simplified block diagram of a light-emitting diode (LED) driver for controlling the intensity of an LED light source.

FIG. 1 is a simplified block diagram of a light-emitting diode (LED) driver 100 for controlling the intensity of an LED light source 102 (e.g., an LED light engine). The LED light source 102 is shown as a plurality of LEDs connected in series but may comprise a single LED or a plurality of LEDs connected in parallel or a suitable combination thereof, depending on the particular lighting system. In addition, the LED light source 102 may alternatively comprise one or more organic light-emitting diodes (OLEDs). The LED driver 100 comprises a hot terminal H and a neutral terminal that are adapted to be coupled to an alternating-current (AC) power source (not shown).

The LED driver 100 comprises a radio-frequency (RFI) filter circuit 110 for minimizing the noise provided on the AC mains and a rectifier circuit 120 for generating a rectified voltage $V_{RECT}$. The LED driver 100 further comprises a boost converter 130, which receives the rectified voltage $V_{RECT}$ and generates a boosted direct-current (DC) bus voltage $V_{BUS}$ across a bus capacitor $C_{BUS}$. The boost converter 130 may alternatively comprise any suitable power converter circuit for generating an appropriate bus voltage, such as, for example, a flyback converter, a single-ended primary-inductor converter (SEPIC), a Ćuk converter, or other suitable power converter circuit. The boost converter 120 may also operate as a power factor correction (PFC) circuit to adjust the power factor of the LED driver 100 towards a power factor of one. The LED driver 100 also comprises an isolated, half-bridge forward converter 140, which receives the bus voltage $V_{BUS}$ and controls the amount of power delivered to the LED light source 102 so as to control the intensity of the LED light source between a low-end (i.e., minimum) intensity $L_{LE}$ (e.g., approximately 1-5%) and a high-end (i.e., maximum) intensity $L_{HE}$ (e.g., approximately 100%).

The LED driver 100 further comprises a control circuit, e.g., a controller 150, for controlling the operation of the boost converter 130 and the forward converter 140. The controller 150 may comprise, for example, a digital controller or any other suitable processing device, such as, for example, a microcontroller, a programmable logic device (PLD), a microprocessor, an application specific integrated circuit (ASIC), or a field-programmable gate array (FPGA). The controller 150 generates a bus voltage control signal $V_{BUS-CNTL}$, which is provided to the boost converter 130 for adjusting the magnitude of the bus voltage $V_{BUS}$. The controller 150 receives from the boost converter 130 a bus voltage feedback control signals $V_{BUS-FB}$, which is representative of the magnitude of the bus voltage $V_{BUS}$.

The controller 150 also generates drive control signals $V_{DRIVE1}$, $V_{DRIVE2}$, which are provided to the forward converter 140 for adjusting the magnitude of a load voltage $V_{LOAD}$ generated across the LED light source 102 and the magnitude of a load current $I_{LOAD}$ conducted through the LED light source to thus control the intensity of the LED light source to a target intensity $L_{TRGT}$. The LED driver 100 further comprises a current sense circuit 160, which is responsive to a sense voltage $V_{SENSE}$ that is generated by the forward converter 140 and is representative of the magnitude of the load current $I_{LOAD}$. The current sense circuit 160 is responsive to a signal-chopper control signal $V_{CHOP}$ (which is received from the controller 150), and generates a load current feedback signal $V_{I-LOAD}$ (which is a DC voltage representative of the magnitude of the load current $I_{LOAD}$). The controller 150 receives the load current feedback signal $V_{I-LOAD}$ from the current sense circuit 160 and controls the drive control signals $V_{DRIVE1}$, $V_{DRIVE2}$ to adjust the magnitude of the load current $I_{LOAD}$ to a target load current $I_{TRGT}$ to thus control the intensity of the LED light source 102 to the target intensity $L_{TRGT}$. The target load current $I_{TRGT}$ may be adjusted between a minimum load current $I_{MIN}$ and a maximum load current $I_{MAX}$.

The controller 150 is coupled to a memory 170 for storing the operational characteristics of the LED driver 100 (e.g., the target intensity $L_{TRGT}$, the low-end intensity $L_{LE}$, the high-end intensity $L_{HE}$, etc.). The LED driver 100 may also comprise a communication circuit 180, which may be coupled to, for example, a wired communication link or a wireless communication link, such as a radio-frequency (RF) communication link or an infrared (IR) communication link. The controller 150 may be operable to update the target intensity $L_{TRGT}$ of the LED light source 102 or the operational characteristics stored in the memory 170 in response to digital messages received via the communication circuit 180. Alternatively, the LED driver 100 could be operable to receive a phase-control signal from a dimmer switch for determining the target intensity $L_{TRGT}$ for the LED light source 102. The LED driver 100 further comprises a power supply 190, which receives the rectified voltage $V_{RECT}$ and generates a direct-current (DC) supply voltage $V_{CC}$ for powering the circuitry of the LED driver.

Figure 2:
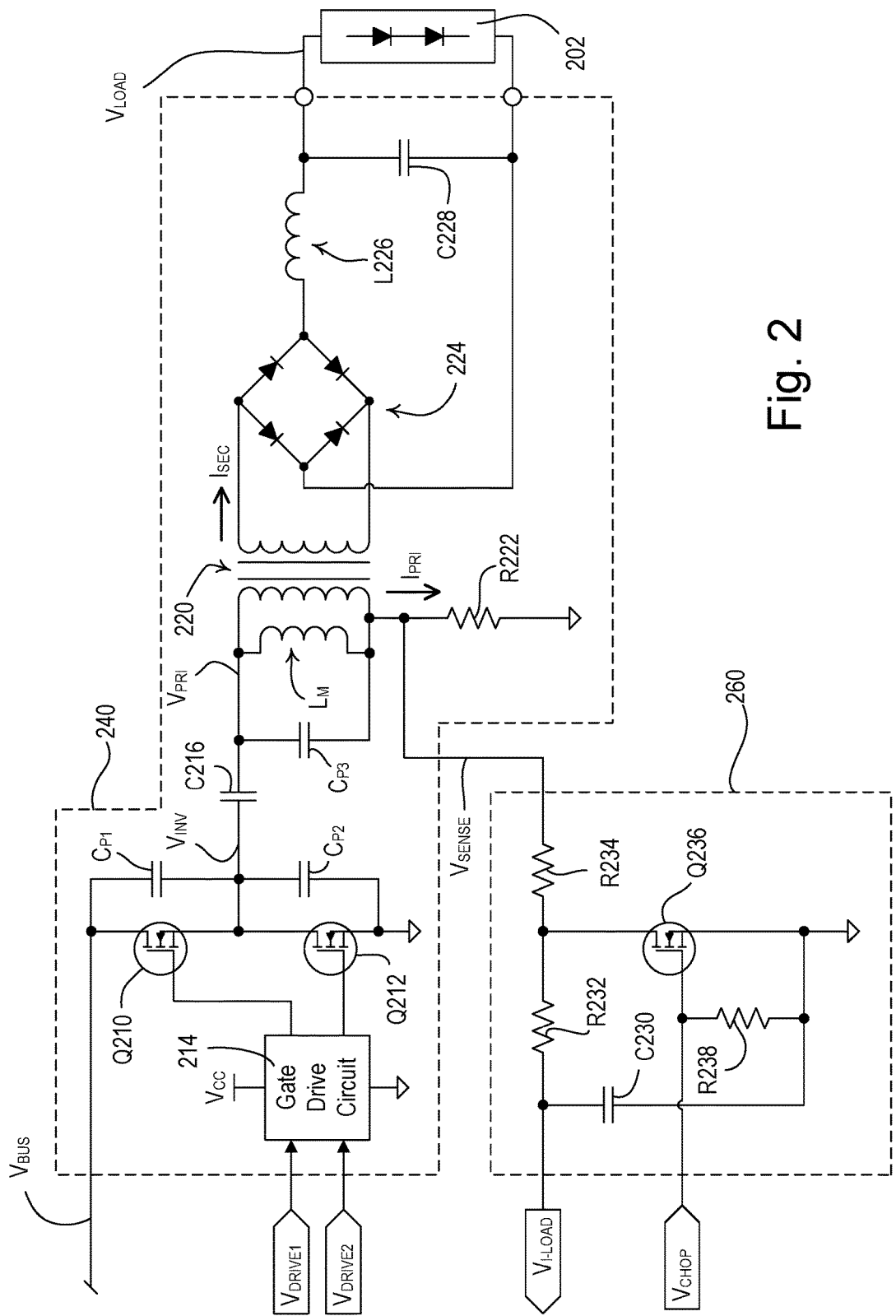
FIG. 2 is a simplified schematic diagram of an isolated forward converter and a current sense circuit of an LED driver.

FIG. 2 is a simplified schematic diagram of a forward converter 240 and a current sense circuit 260, e.g., the forward converter 140 and the current sense circuit 160 of the LED driver 100 shown in FIG. 1. The forward converter 240 comprises a half-bridge inverter circuit having two field effect transistors (FETs) Q210, Q212 for generating a high-frequency inverter voltage $V_{INV}$ from the bus voltage $V_{BUS}$. The FETs Q210, Q212 are rendered conductive and non-conductive in response to the drive control signals $V_{DRIVE1}$, $V_{DRIVE2}$, which are received from a controller (e.g., the controller 150). The drive control signals $V_{DRIVE1}$, $V_{DRIVE2}$ are coupled to the gates of the respective FETs Q210, Q212 via a gate drive circuit 214 (e.g., part number L6382DTR, manufactured by ST Microelectronics). The controller generates the inverter voltage $V_{INV}$ at a constant operating frequency fop (e.g., approximately 60-65 kHz) and thus a constant operating period $T_{OP}$. However, the operating frequency fop may be adjusted under certain operating conditions. The controller adjusts the duty cycle DC of the inverter voltage $V_{INV}$ to adjust the magnitude of the load current $I_{LOAD}$ and thus the intensity of an LED light source 202. The forward converter 240 may be characterized by a turn-on time $T_{TURN-ON}$ from when the drive control signals $V_{DRIVE1}$, $V_{DRIVE2}$ are driven high until the respective FET Q210, Q212 is rendered conductive, and a turn-off time $T_{TURN-OFF}$ from when the drive control signals $V_{DRIVE1}$, $V_{DRIVE2}$ are driven low until the respective FET Q210, Q212 is rendered non-conductive.

The inverter voltage $V_{INV}$ is coupled to the primary winding of a transformer 220 through a DC-blocking capacitor C216 (e.g., having a capacitance of approximately 0.047 g), such that a primary voltage $V_{PRI}$ is generated across the primary winding. The transformer 220 is characterized by a turns ratio $n_{TURNS}$ (i.e., $N_1/N_2$) of approximately 115:29. The sense voltage $V_{SENSE}$ is generated across a sense resistor R222, which is coupled series with the primary winding of the transformer 220. The FETs Q210, Q212 and the primary winding of the transformer 220 are characterized by parasitic capacitances $C_{P1}$, $C_{P2}$, $C_{P3}$.

The secondary winding of the transformer 220 generates a secondary voltage, which is coupled to the AC terminals of a full-wave diode rectifier bridge 224 for rectifying the secondary voltage generated across the secondary winding. The positive DC terminal of the rectifier bridge 224 is coupled to the LED light source 202 through an output energy-storage inductor L226 (e.g., having an inductance of approximately 10 mH), such that the load voltage $V_{LOAD}$ is generated across an output capacitor C228 (e.g., having a capacitance of approximately 3 μF).

Figure 3:
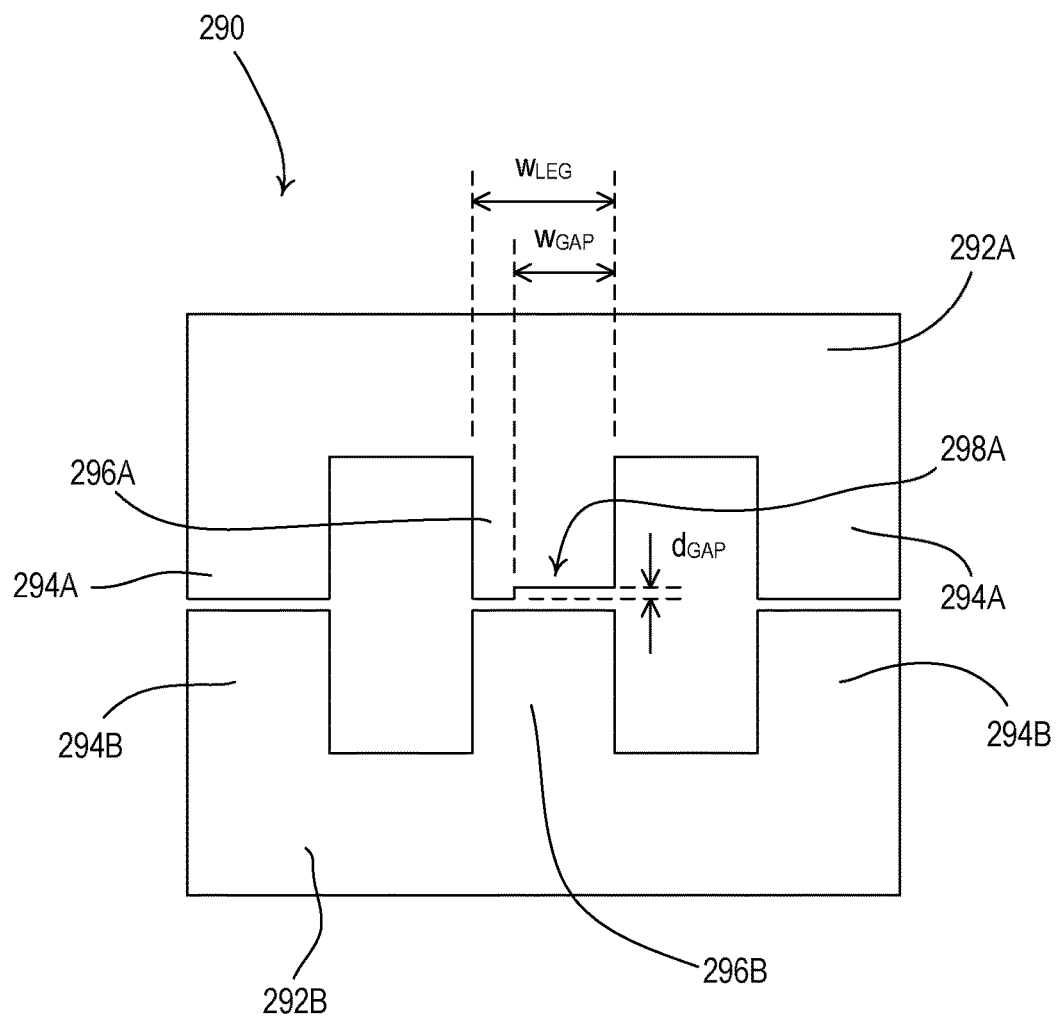
FIG. 3 is an example diagram illustrating a magnetic core set of an energy-storage inductor of a forward converter.

FIG. 3 is an example diagram illustrating a magnetic core set 290 of an energy-storage inductor (e.g., the output energy-storage inductor L226 of the forward converter 240 shown in FIG. 2). The magnetic core set 290 comprises two E-cores 292A, 292B, and may comprise part number PC40EE16-Z, manufactured by TDK Corporation. The E-cores 292A have respective outer legs 294A, 294B and inner legs 296A, 296B. Each inner leg 296A, 296B may have a width $w_{LEG}$ (e.g., approximately 4 mm). The inner leg 296A of the first E-core 292A has a partial gap 298A (i.e., the magnetic core set 290 is partially-gapped), such that the inner legs 296A, 296B are spaced apart by a gap distance $d_{GAP}$ (e.g., approximately 0.5 mm). The partial gap 298A may extend for a gap width $w_{GAP}$, e.g., approximately 2.8 mm, such that the gap extends for approximately 70% of the leg width $w_{LEG}$ of the inner leg 296A. Alternatively, both of the inner legs 296A, 296B could comprise partial gaps. The partially-gapped magnetic core set 290 shown in FIG. 3 allows the output energy-storage inductor L226 of the forward converter 240 shown in FIG. 2 to maintain continuous current at low load conditions (e.g., near the low-end intensity $L_{LE}$).

Figure 4:
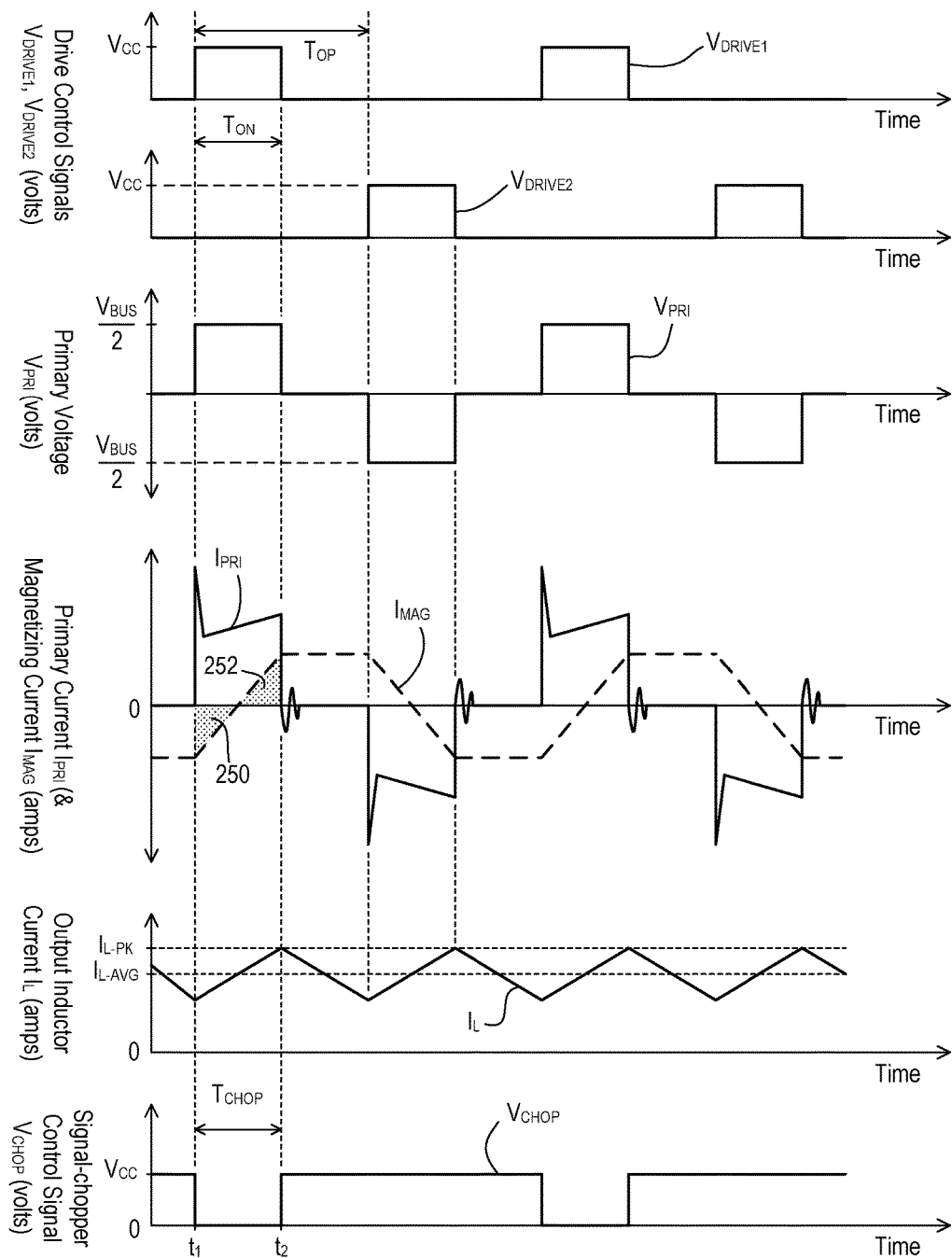
FIG. 4 shows example waveforms illustrating the operation of a forward converter and a current sense circuit when the intensity of an LED light source is near a high-end intensity.

FIG. 4 shows example waveforms illustrating the operation of a forward converter and a current sense circuit, e.g., the forward converter 240 and the current sense circuit 260 shown in FIG. 2. The controller drives the respective drive control signals $V_{DRIVE1}$, $V_{DRIVE2}$ high to approximately the supply voltage $V_{CC}$ to render the respective FETs Q210, Q212 conductive for an on time $T_{ON}$ at different times (i.e., the FETs Q210, Q212 are not conductive at the same time). When the high-side FET Q210 is conductive, the primary winding of the transformer 220 conducts a primary current $I_{PRI}$ to circuit common through the capacitor C216 and sense resistor R222. Immediately after the high-side FET Q210 is rendered conductive (at time $t_1$ in FIG. 4), the primary current $I_{PRI}$ conducts a short high-magnitude pulse of current due to the parasitic capacitance $C_{P3}$ of the transformer 220 as shown in FIG. 4. While the high-side FET Q210 is conductive, the capacitor C216 charges, such that a voltage having a magnitude of approximately half of the magnitude of the bus voltage $V_{BUS}$ is developed across the capacitor. Accordingly, the magnitude of the primary voltage $V_{PRI}$ across the primary winding of the transformer 220 is approximately equal to approximately half of the magnitude of the bus voltage $V_{BUS}$. When the low-side FET Q212 is conductive, the primary winding of the transformer 220 conducts the primary current $I_{PRI}$ in an opposite direction and the capacitor C216 is coupled across the primary winding, such that the primary voltage $V_{PRI}$ has a negative polarity with a magnitude equal to approximately half of the magnitude of the bus voltage $V_{BUS}$.

When either of the high-side and low-side FETs Q210, Q212 are conductive, the magnitude of an output inductor current $I_L$ conducted by the output inductor L226 and the magnitude of the load voltage $V_{LOAD}$ across the LED light source 202 both increase with respect to time. The magnitude of the primary current $I_{PRI}$ also increases with respect to time while the FETs Q210, Q212 are conductive (after the initial current spike). When the FETs Q210, Q212 are non-conductive, the output inductor current $I_L$ and the load voltage $V_{LOAD}$ both decrease in magnitude with respective to time. The output inductor current $I_L$ is characterized by a peak magnitude $I_{L-PK}$ and an average magnitude $I_{L-AVG}$ as shown in FIG. 4. The controller increases and decreases the on times $T_{ON}$ of the drive control signals $V_{DRIVE1}$, $V_{DRIVE2}$ (and the duty cycle DC of the inverter voltage $V_{INV}$) to respectively increase and decrease the average magnitude $I_{L-AVG}$ of the output inductor current $I_L$ and thus respectively increase and decrease the intensity of the LED light source 102.

When the FETs Q210, Q212 are rendered non-conductive, the magnitude of the primary current $I_{PRI}$ drops toward zero amps (e.g., as shown at time $t_2$ in FIG. 4 when the high-side FET Q210 is rendered non-conductive). However, current may continue to flow through the primary winding of the transformer 220 due to the magnetizing inductance $L_{MAG}$ of the transformer (which conducts a magnetizing current $I_{MAG}$). In addition, when the target intensity $L_{TRGT}$ of the LED light source 102 is near the low-end intensity $L_{LE}$, the magnitude of the primary current $I_{PRI}$ oscillates after either of the FETs Q210, Q212 is rendered non-conductive due to the parasitic capacitances $C_{P1}$, $C_{P2}$ of the FETs, the parasitic capacitance $C_{P3}$ of the primary winding of the transformer 220, and any other parasitic capacitances of the circuit, such as, parasitic capacitances of the printed circuit board on which the forward converter 240 is mounted.

The real component of the primary current $I_{PRI}$ is representative of the magnitude of the secondary current $I_{SEC}$ and thus the intensity of the LED light source 202. However, the magnetizing current $I_{MAG}$ (i.e., the reactive component of the primary current $I_{PRI}$) also flows through the sense resistor R222. The magnetizing current $I_{MAG}$ changes from negative to positive polarity when the high-side FET Q210 is conductive, changes from positive to negative polarity when the low-side FET Q212 is conductive, and remains constant when the magnitude of the primary voltage $V_{PRI}$ is zero volts as shown in FIG. 4. The magnetizing current $I_{MAG}$ has a maximum magnitude defined by the following equation:

$$I_{MAG-MAX} = \frac{V_{BUS} \cdot T_{HC}}{4 \cdot L_{MAG}}. \quad \text{(Equation 1)}$$

where $T_{HC}$ is the half-cycle period of the inverter voltage $V_{INV}$, i.e., $T_{HC}=T_{OP}/2$. As shown in FIG. 4, the areas 250, 252 are approximately equal, such that the average value of the magnitude of the magnetizing current $I_{MAG}$ when the magnitude of the primary voltage $V_{PRI}$ is greater than approximately zero volts.

The current sense circuit 260 averages the primary current $I_{PRI}$ during the positive cycles of the inverter voltage $V_{INV}$, i.e., when the high-side FET Q210 is conductive. The load current feedback signal $V_{I-LOAD}$ generated by the current sense circuit 260 has a DC magnitude that is the average value of the primary current $I_{PRI}$ when the high-side FET Q210 is conductive. Because the average value of the magnitude of the magnetizing current $I_{MAG}$ is approximately zero when the high-side FET Q210 is conductive, the load current feedback signal $V_{I-LOAD}$ generated by the current sense circuit is representative of only the real component of the primary current $I_{PRI}$.

The current sense circuit 260 comprises an averaging circuit for producing the load current feedback signal $V_{I-LOAD}$. The averaging circuit may comprise a low-pass filter having a capacitor C230 (e.g., having a capacitance of approximately 0.066 uF) and a resistor R232 (e.g., having a resistance of approximately 3.32 kΩ). The low-pass filter receives the sense voltage $V_{SENSE}$ via a resistor R234 (e.g., having resistances of approximately 1 kΩ). The current sense circuit 160 further comprises a transistor Q236 (e.g., a FET as shown in FIG. 2) coupled between the junction of the resistors R232, R234 and circuit common. The gate of the transistor Q236 is coupled to circuit common through a resistor R238 (e.g., having a resistance of approximately 22 kΩ) and receives the signal-chopper control signal $V_{CHOP}$ from the controller.

When the high-side FET Q210 is rendered conductive, the controller drives the signal-chopper control signal $V_{CHOP}$ low towards circuit common to render the transistor Q236 non-conductive for a signal-chopper time $T_{CHOP}$, which is approximately equal to the on time $T_{ON}$ of the high-side FET Q210 as shown in FIG. 4. The capacitor C230 is able to charge from the sense voltage $V_{SENSE}$ through the resistors R232, R234 while the signal-chopper control signal $V_{CHOP}$ is low, such that the magnitude of the load current feedback signal $V_{I\text{-}LOAD}$ is the average value of the primary current $I_{PRI}$ and is thus representative of the real component of the primary current during the time when the high-side FET Q210 is conductive. When the high-side FET Q210 is not conductive, the controller 150 drives the signal-chopper control signal $V_{CHOP}$ high to render the transistor Q236 non-conductive. Accordingly, the controller is able to accurately determine the average magnitude of the load current $I_{LOAD}$ from the magnitude of the load current feedback signal $V_{I\text{-}LOAD}$ since the effects of the magnetizing current $I_{MAG}$ and the oscillations of the primary current $I_{PRI}$ on the magnitude of the load current feedback signal $V_{I\text{-}LOAD}$ are reduced or eliminated completely.

As the target intensity $L_{TRGT}$ of the LED light source 202 is decreased towards the low-end intensity $L_{LE}$ (and the on times $T_{ON}$ of the drive control signals $V_{DRIVE1}$, $V_{DRIVE2}$ get smaller), the parasitic of the forward converter 140 (i.e., the parasitic capacitances $C_{P1}$, $C_{P2}$ of the FETs, the parasitic capacitance $C_{P3}$ of the primary winding of the transformer 220, and other parasitic capacitances of the circuit) can cause the magnitude of the primary voltage $V_{PRI}$ to slowly decrease towards zero volts after the FETs Q210, Q212 are rendered non-conductive.

Figure 5:
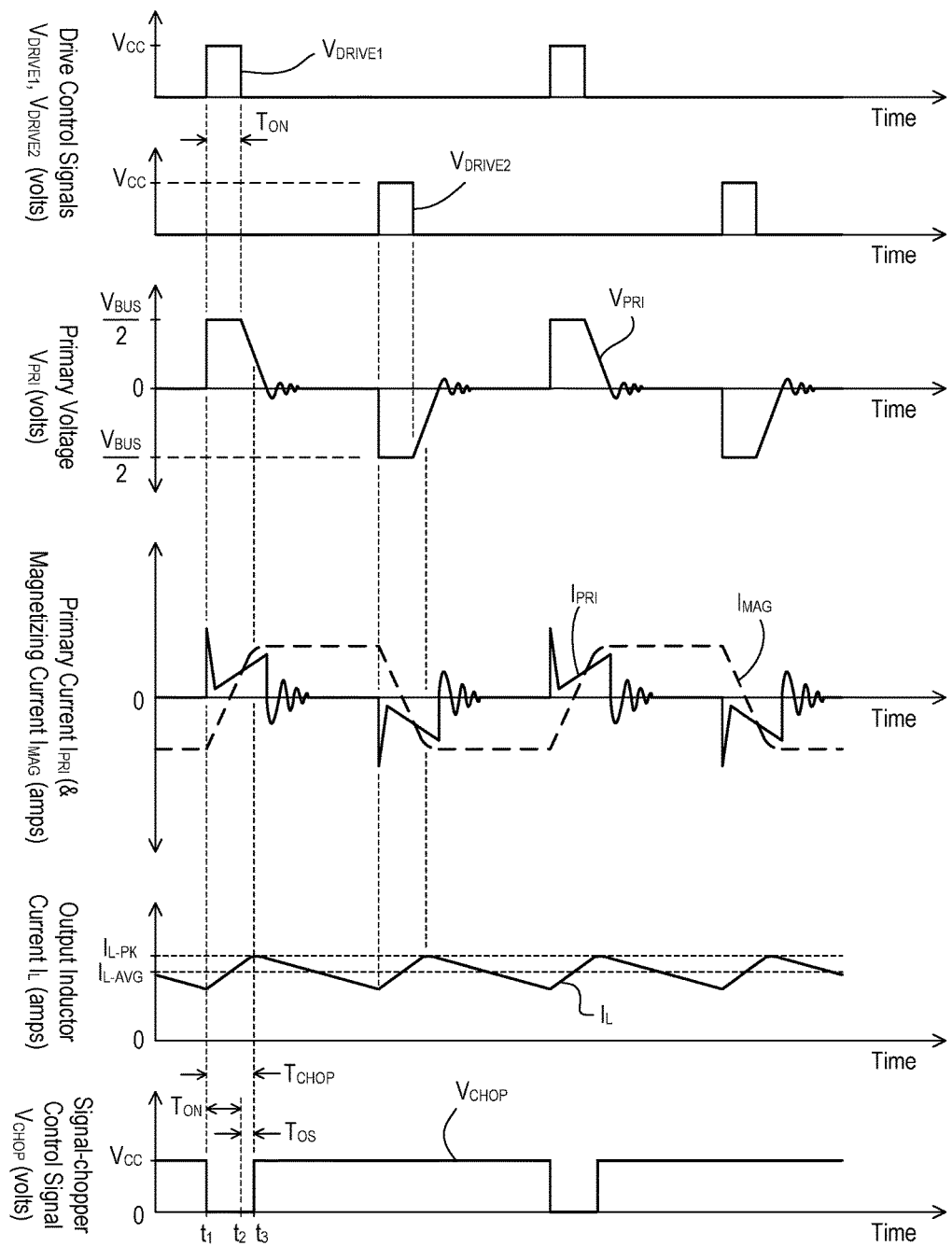
FIG. 5 shows example waveforms illustrating the operation of a forward converter and a current sense circuit when the intensity of an LED light source is near a low-end intensity.
Figure 6:
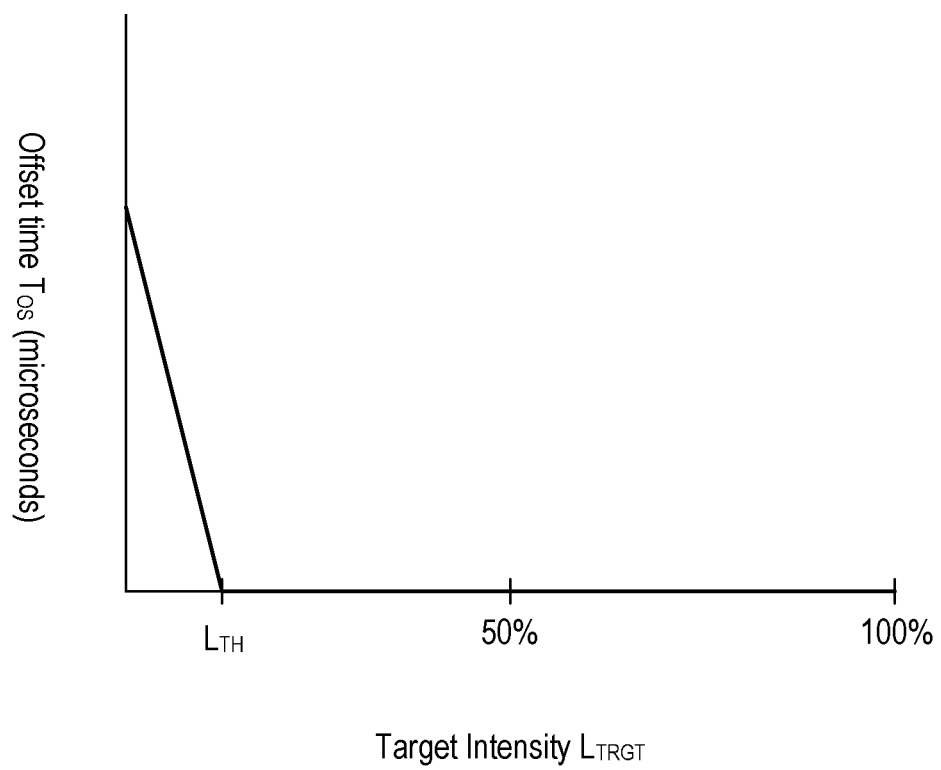
FIG. 6 is an example plot of a relationship between an offset time and a target intensity of an LED driver.

FIG. 5 shows example waveforms illustrating the operation of a forward converter and a current sense circuit (e.g., the forward converter 240 and the current sense circuit 260) when the target intensity $L_{TRGT}$ is near the low-end intensity $L_{LE}$. The gradual drop off in the magnitude of the primary voltage $V_{PRI}$ allows the primary winding to continue to conduct the primary current $I_{PRI}$, such that the transformer 220 continues to delivered power to the secondary winding after the FETs Q210, Q212 are rendered non-conductive as shown in FIG. 5. In addition, the magnetizing current $I_{MAG}$ continues to increase in magnitude. Accordingly, the controller 150 increases the signal-chopper time $t_{CHOP}$ (during which the signal-chopper control signal $V_{CHOP}$ is low) by an offset time $T_{OS}$ when the target intensity $L_{TRGT}$ of the LED light source 202 is near the low-end intensity $L_{LE}$. The controller may adjust the value of the offset time $T_{OS}$ as a function of the target intensity $L_{TRGT}$ of the LED light source 202 as shown in FIG. 6. For example, the controller may adjust the value of the offset time $T_{OS}$ linearly with respect to the target intensity $L_{TRGT}$ when the target intensity $L_{TRGT}$ is below a threshold intensity $L_{TH}$ (e.g., approximately 10%) as shown in FIG. 5.

Figure 7:
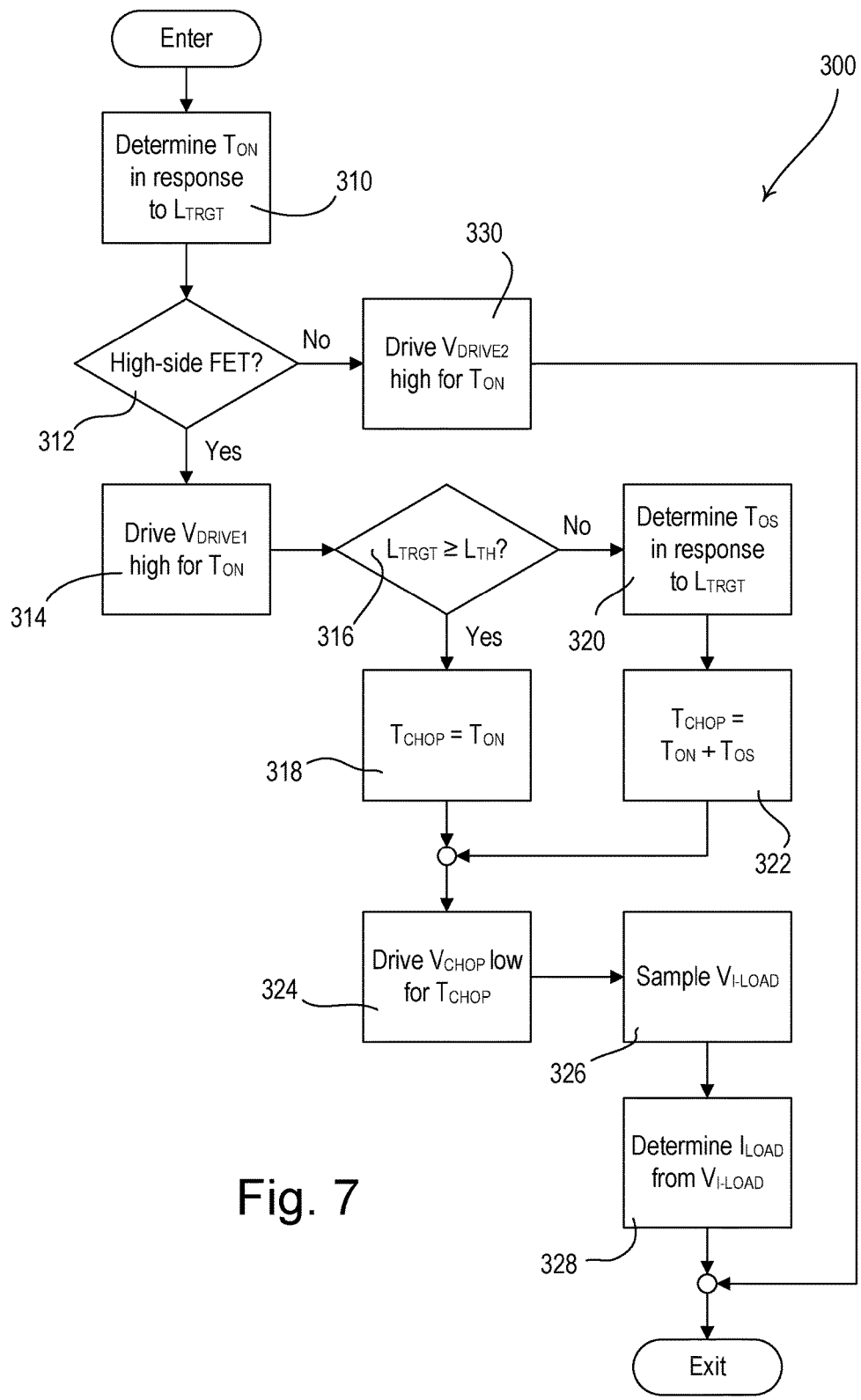
FIG. 7 is a simplified flowchart of a control procedure executed periodically by a controller of an LED driver.

FIG. 7 is a simplified flowchart of a control procedure 300 executed periodically by a controller (e.g., the controller 150 of the LED driver 100 shown in FIG. 1 and/or the controller controlling the forward converter 240 and the current sense circuit 260 shown in FIG. 2). The controller may execute the control procedure 300, for example, at the operating period Top of the inverter voltage $V_{INV}$ of the forward converter 240. First, the controller determines the appropriate on time $T_{ON}$ for the drive control signals $V_{DRIVE1}$, $V_{DRIVE2}$ in response to the target intensity $L_{TRGT}$ and the load current feedback signal $V_{I\text{-}LOAD}$ at step 310. If the controller should presently control the high-side FET Q210 at step 312, the controller drives the first drive control signal $V_{DRIVE1}$ high to approximately the supply voltage $V_{CC}$ for the on time $T_{ON}$ at step 314. If the target intensity $L_{TRGT}$ is greater than or equal to the threshold intensity $L_{TH}$ at step 316, the controller 150 sets the signal-chopper time $t_{CHOP}$ equal to the on time $T_{ON}$ at step 318. If the target intensity $L_{TRGT}$ is less than the threshold intensity $L_{TH}$ at step 316, the controller determines the offset time $T_{OS}$ in response to the target intensity $L_{TRGT}$ at step 320 (e.g., using the relationship shown in FIG. 6), and sets the signal-chopper time $t_{CHOP}$ equal to the sum of the on time $T_{ON}$ and the offset time $T_{OS}$ at step 322.

Next, the controller drives the signal-chopper control signal $V_{CHOP}$ low towards circuit common for the signal-chopper time Tamp at step 324. The controller then samples the averaged load current feedback signal $V_{I\text{-}LOAD}$ at step 326 and calculates the magnitude of the load current $I_{LOAD}$ using the sampled value at step 328, for example, using the following equation:

$$I_{LOAD} = \frac{n_{TURNS} \cdot V_{I\text{-}LOAD} \cdot T_{HC}}{R_{SENSE} \cdot (T_{CHOP} - T_{DELAY})}, \quad \text{(Equation 2)}$$

where $T_{DELAY}$ is the total delay time due to the turn-on time and the turn-off time of the FETs Q210, Q212, e.g., $T_{DELAY} = T_{TURN\text{-}ON} - T_{TURN\text{-}OFF}$, which may be equal to approximately 200 μsec. Finally, the control procedure 300 exits after the magnitude of the load current $I_{LOAD}$ has been calculated. If the controller should presently control the low-side FET Q210 at step 312, the controller drives the second drive control signal $V_{DRIVE2}$ high to approximately the supply voltage $V_{CC}$ for the on time $T_{ON}$ at step 330, and the control procedure 300 exits without the controller driving the signal-chopper control signal $V_{CHOP}$ low.

Figure 8:
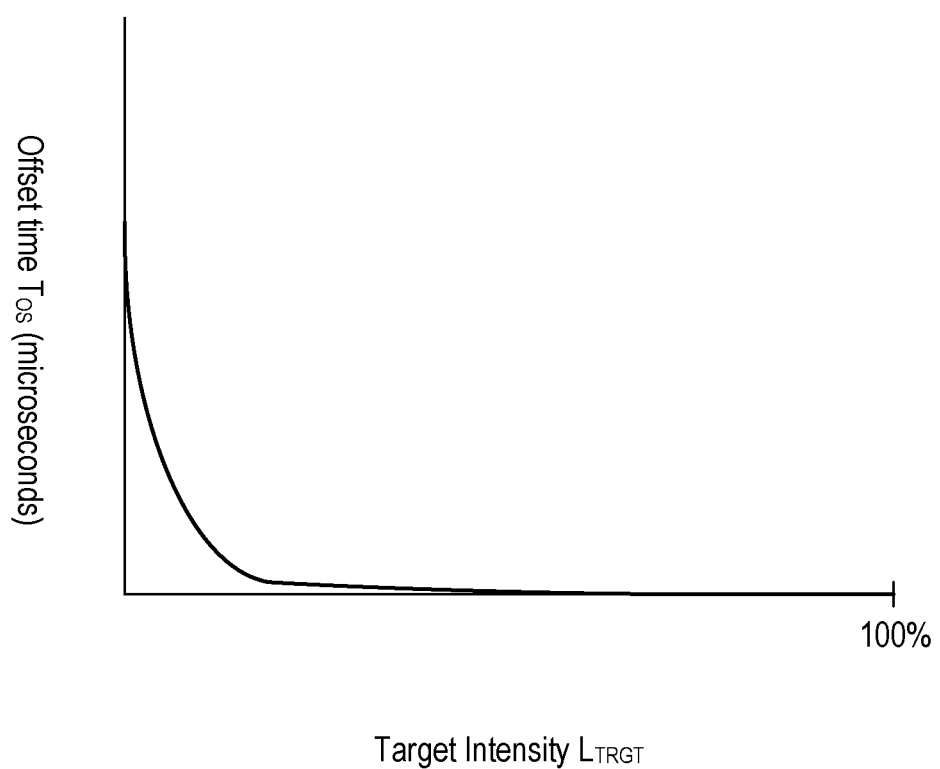
FIG. 8 is an example plot of a relationship between the offset time and the target intensity of an LED driver.

Alternatively, the controller can use a different relationship to determine the offset time $T_{OS}$ throughout the entire dimming range of the LED light source (i.e., from the low-end intensity $L_{LE}$ to the high-end intensity $L_{HE}$) as shown in FIG. 8. For example, the controller could use the following equation:

$$T_{OS} = \frac{\frac{V_{BUS}}{4} \cdot C_{PARASITIC}}{\frac{T_{ON} + T_{OS\text{-}PREV}}{T_{HC}} \cdot I_{MAG\text{-}MAX} + \frac{K_{RIPPLE}}{n_{TURNS}} \cdot I_{LOAD}}, \quad \text{(Equation 3)}$$

where $T_{OS\text{-}PREV}$ is the previous value of the offset time, $K_{RIPPLE}$ is the dynamic ripple ratio of the output inductor current $I_L$ (which is a function of the load current $I_{LOAD}$) i.e., $$K_{RIPPLE} = I_{L\text{-}PK}/I_{L\text{-}AVG}, \quad \text{(Equation 4)}$$

and $C_{PARASITIC}$ is the total parasitic capacitance between the junction of the FETs Q210, Q212 and circuit common.

As previously mentioned, the controller increases and decreases the on times $T_{ON}$ of the drive control signals $V_{DRIVE1}$, $V_{DRIVE2}$ for controlling the FETs Q210, Q212 of the forward converter 140 to respectively increase and decrease the intensity of the LED light source. Due to hardware limitations, the controller may be operable to adjust the on times $T_{ON}$ of the drive control signals $V_{DRIVE1}$, $V_{DRIVE2}$ by a minimum time step $T_{STEP}$, which results in a corresponding step $I_{STEP}$ in the load current $I_{LOAD}$. Near the high-end intensity $L_{HE}$, this step $I_{STEP}$ in the load current $I_{LOAD}$ may be rather large (e.g., approximately 70 mA). Since it is desirable to adjust the load current $I_{LOAD}$ by smaller amounts, the controller is operable to "dither" the on times $T_{ON}$ of the drive control signals $V_{DRIVE1}$, $V_{DRIVE2}$, e.g., change the on times between two values that result in the magnitude of the load current being controlled to DC currents on either side of the target current $I_{TRGT}$.

Figure 9:
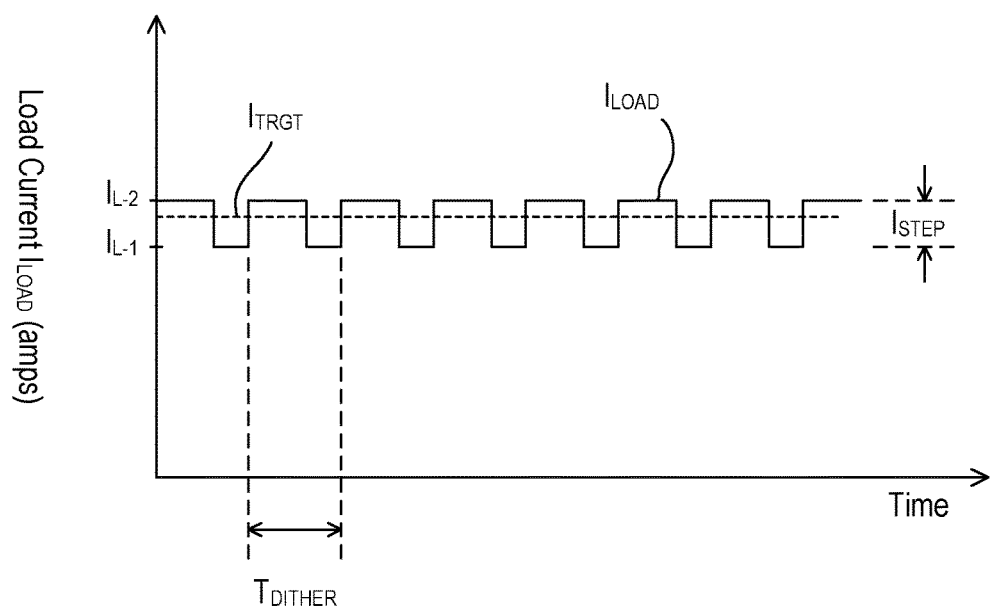
FIG. 9 shows an example waveform of a load current conducted through an LED light source when a target current of an LED driver is at a steady-state value.

FIG. 9 shows an example waveform of a load current conducted through an LED light source (e.g., the load current $I_{LOAD}$). For example, the load current $I_{LOAD}$ shown in FIG. 9 may be conducted through the LED light source when the target current $I_{TRGT}$ is at a steady-state value of approximately 390 mA. A controller (e.g., the controller 150 of the LED driver 100 shown in FIG. 1 and/or the controller controlling the forward converter 240 and the current sense circuit 260 shown in FIG. 2) may control a forward converter (e.g., the forward converter 140, 240) to conduct the load current $I_{LOAD}$ shown in FIG. 9 through the LED light source. The controller adjusts the on times $T_{ON}$ of the drive control signals $V_{DRIVE1}$, $V_{DRIVE2}$ to control the magnitude of the load current $I_{LOAD}$ to between two DC currents $I_{L-1}$, $I_{L-2}$ that are separated by the step $I_{STEP}$ (e.g., approximately 350 mA and 420 mA, respectively). The load current $I_{LOAD}$ is characterized by a dithering frequency $f_{DITHER}$ (e.g., approximately 2 kHz) and a dithering period $T_{DITHER}$ as shown in FIG. 9. For example, a duty cycle $DC_{DITHER}$ of the load current $I_{LOAD}$ may be approximately 57%, such that the average magnitude of the load current $I_{LOAD}$ is approximately equal to the target current $I_{TRGT}$ (e.g., 390 mA for the example of FIG. 9).

Figure 10:
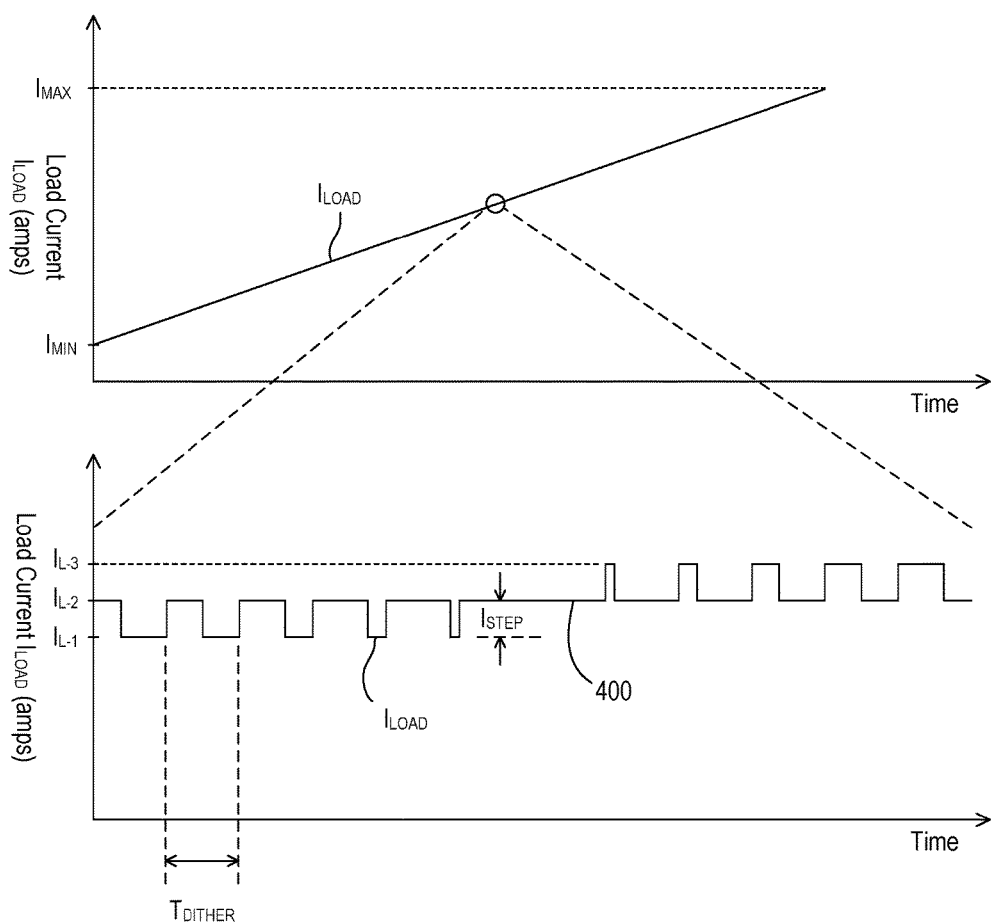
FIG. 10 shows an example waveform of the load current conducted through the LED light source when the target current of the LED driver is being increased with respect to time.

FIG. 10 shows an example waveform of the load current $I_{LOAD}$ when the target current $I_{TRGT}$ is being increased with respect to time. As shown in FIG. 10, the controller 150 is able to adjust the on times $T_{ON}$ of the drive control signals $V_{DRIVE1}$, $V_{DRIVE2}$ to control the magnitude of the load current $I_{LOAD}$ to between two DC currents $I_{L-1}$, $I_{L-2}$ that are separated by the step $I_{STEP}$. The duty cycle $DC_{DITHER}$ of the load current $I_{LOAD}$ increases as the target current $I_{TRGT}$ increases. At some point, the controller is able to control the on times $T_{ON}$ of the drive control signals $V_{DRIVE1}$, $V_{DRIVE2}$ to achieve the desired target current $I_{TRGT}$ without dithering the on times, thus resulting in a constant section 400 of the load current $I_{LOAD}$. As the target current $I_{TRGT}$ continues to increase after the constant section 400, the controller is able to control the on times $T_{ON}$ of the drive control signals $V_{DRIVE1}$, $V_{DRIVE2}$ to dither the magnitude of the load current $I_{LOAD}$ between the DC current $I_{L-2}$ and a larger DC current $I_{L-3}$.

Figure 11:
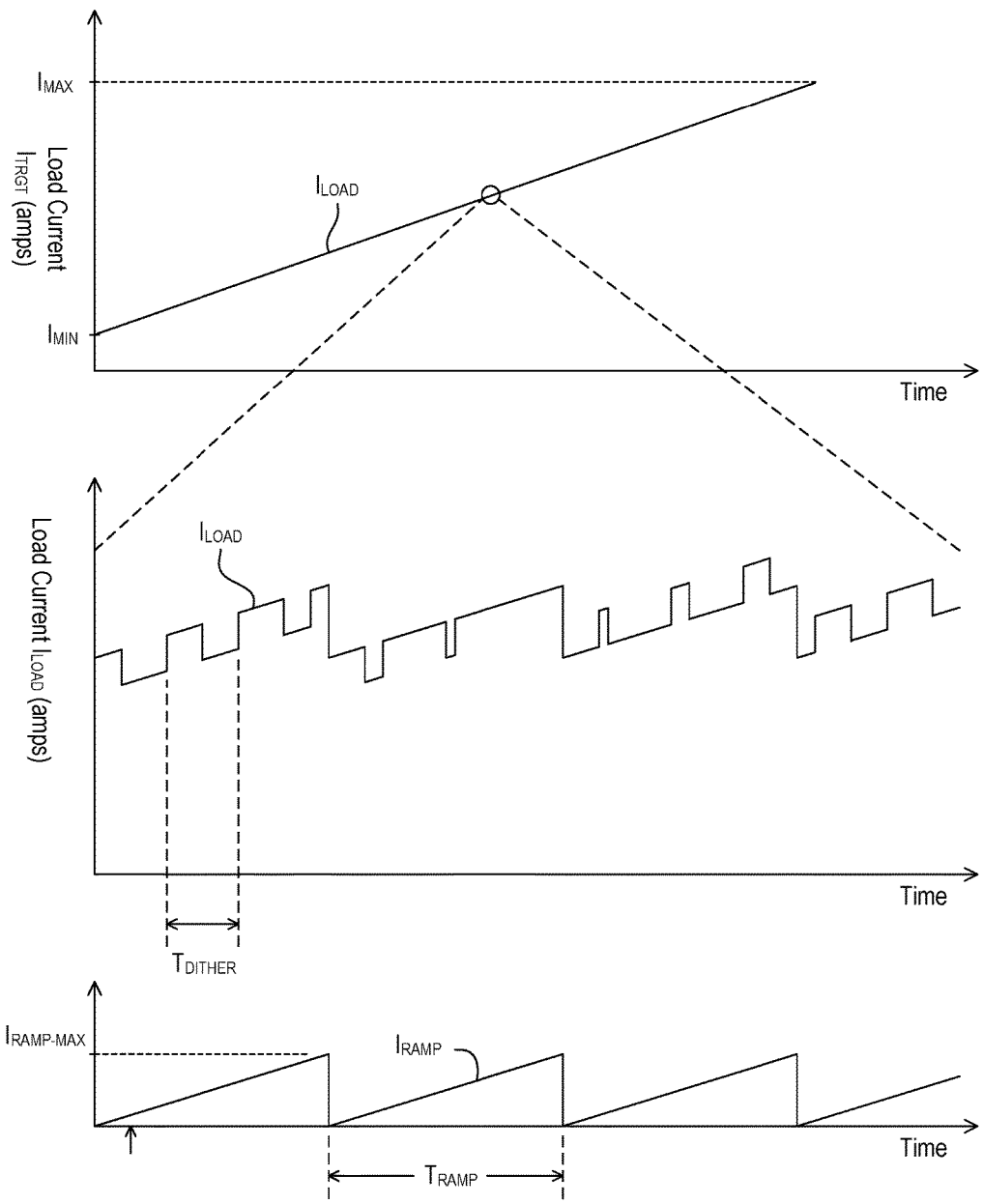
FIG. 11 shows example waveforms of a ramp signal of an LED driver and a load current conducted through an LED light source when the ramp signal is added to a target current.

However, the constant section 400 of the load current $I_{LOAD}$ as shown in FIG. 10 may cause the human eye to detect a visible step in the adjustment of the intensity of the LED light source. Therefore, when the controller is actively adjusting the intensity of the LED light source, the controller is operable to add a periodic supplemental signal (e.g., a ramp signal $I_{RAMP}$ or sawtooth waveform) to the target current $I_{TRGT}$. FIG. 11 shows example waveforms of the ramp signal $I_{RAMP}$ and the resulting load current $I_{LOAD}$ when the ramp signal is added to the target current $I_{TRGT}$. Note that these waveforms are not to scale and the ramp signal $I_{RAMP}$ is a digital waveform. The ramp signal $I_{RAMP}$ is characterized by a ramp frequency $f_{RAMP}$ (e.g., approximately 238 Hz) and a ramp period $T_{RAMP}$. The ramp signal $I_{RAMP}$ may have, for example, a maximum ramp signal magnitude $I_{RAMP-MAX}$ of approximately 150 mA. The ramp signal $I_{RAMP}$ and may increase with respect to time in, for example, approximately 35 steps across the length of the ramp period $T_{RAMP}$. When the controller adds the ramp signal $I_{RAMP}$ to the target current $I_{TRGT}$ to control the on times $T_{ON}$ of the drive control signals $V_{DRIVE1}$, $V_{DRIVE2}$, the resulting load current $I_{LOAD}$ has a varying magnitude as shown in FIG. 11.

As a result, the perception to the human eye of the visible steps in the intensity of the LED light source as the controller is actively adjusting the intensity of the LED light source is reduced.

When the target current $I_{TRGT}$ returns to a steady-state value, the controller may stop adding the ramp signal $I_{RAMP}$ to the target current $I_{TRGT}$. For example, the controller may decrease the magnitude of the ramp signal $I_{RAMP}$ from the maximum ramp signal magnitude $I_{RAMP-MAX}$ to zero across a period of time after the target current $I_{TRGT}$ has reached a steady-state value.

While FIG. 11 shows the ramp signal $I_{RAMP}$ (i.e., a sawtooth waveform) that is added to the target current $I_{TRGT}$, other periodic waveforms could be used.

Although the present disclosure has been described in relation to particular embodiments thereof, many other variations and modifications and other uses will become apparent to those skilled in the art. It is preferred, therefore, that the present disclosure be limited not by the specific disclosure herein, but only by the appended claims.

What is claimed is:

1. A load control device for controlling an amount of power delivered to an electrical load, the load control device comprising:
   first and second semiconductor switches electrically coupled in series and configured to be controlled to generate an inverter voltage at a junction of the first and second semiconductor switches;
   a transformer comprising a primary winding electrically coupled between circuit common and the junction of the first and second semiconductor switches, the transformer further comprising a secondary winding adapted to supply current to the electrical load, the transformer configured to transfer power to the secondary winding when either of the first and second semiconductor switches is conductive;
   a capacitor electrically coupled between the junction of the first and second semiconductor switches and the primary winding of the transformer to cause a primary voltage across the primary winding to have a positive polarity when the first semiconductor switch is conductive and a negative polarity when the second semiconductor switch is conductive;
   a controller configured to control the first semiconductor switch to control a load current conducted through the electrical load; and
   a current sense circuit configured to receive a sense voltage representative of a magnitude of a primary current conducted through the primary winding, the current sense circuit comprising an averaging circuit configured to average the sense voltage when the first semiconductor switch is conductive to generate a load current control signal that is representative of a real component of the primary current.

2. The load control device of claim 1, wherein the first and second semiconductor switches are configured to be coupled across a bus voltage.

3. The load control device of claim 2, further comprising:
   an isolated forward converter comprising the transformer and the first and second semiconductor switches, the isolated forward converter configured to receive the bus voltage and to conduct the load current through the electrical load.

4. The load control device of claim 1, wherein the current sense circuit comprises a third semiconductor switch configured to disconnect the sense voltage from the averaging circuit, the controller configured to render the third semiconductor switch conductive and non-conductive to provide the sense voltage to the averaging circuit when the first semiconductor switch is conductive.

5. The load control device of claim 4, wherein the controller is configured to render the first semiconductor switch conductive for an on time and control the third semiconductor switch to provide the sense voltage to the averaging circuit for the on time.

6. The load control device of claim 4, wherein the controller is configured to render the first semiconductor switch conductive for an on time, and control the third semiconductor switch to provide the sense voltage to the averaging circuit for the on time plus an additional amount of time when a target amount of power to be delivered to the electrical load is less than a threshold amount.

7. The load control device of claim 4, wherein the sense voltage is coupled to the averaging circuit through two series-connected resistors, the third semiconductor switch coupled between the junction of the two resistors and circuit common to allow the sense voltage to be provided to the averaging circuit when the third semiconductor switch is non-conductive.

8. The load control device of claim 1, further comprising a sense resistor coupled in series with the primary winding of the transformer, the sense resistor configured to produce the sense voltage.

9. A load control device for controlling an amount of power delivered to an electrical load, the load control device comprising:
a transformer comprising a primary winding electrically coupled in series with a first semiconductor switch and a secondary winding adapted to supply current to the electrical load;
a controller configured to control the first semiconductor switch to control a load current conducted through the electrical load, the controller configured to control the amount of power delivered to the electrical load to a target amount of power; and
a current sense circuit configured to receive a sense voltage representative of a magnitude of a primary current conducted through the primary winding, the current sense circuit configured to average the sense voltage for an on time when the first semiconductor switch is conductive plus an additional amount of time to generate a load current control signal that is representative of a real component of the primary current.

10. The load control device of claim 9, further comprising:
a second semiconductor switch, the first and second semiconductor switches electrically coupled in series and configured to be controlled to generate an inverter voltage at a junction of the first and second semiconductor switches;
wherein the transformer is configured to transfer power to the secondary winding when either of the first and second semiconductor switches is conductive.

11. The load control device of claim 10, further comprising:
a capacitor electrically coupled between the junction of the first and second semiconductor switches and the primary winding of the transformer to cause a primary voltage across the primary winding to have a positive polarity when the first semiconductor switch is conductive and a negative polarity when the second semiconductor switch is conductive.

12. The load control device of claim 9, wherein the current sense circuit is configured to average the sense voltage for the on time plus the additional amount of time when the target amount of power is less than a threshold amount.

13. The load control device of claim 12, wherein the additional amount of time is a function of the target amount of power.

14. The load control device of claim 13, wherein the additional amount of time increases linearly as the target amount of power decreases.

15. The load control device of claim 9, further comprising:
a sense resistor coupled in series with the primary winding and configured to produce the sense voltage.

16. An LED driver for controlling an intensity of an LED light source, the LED driver comprising:
a transformer comprising a primary winding and a secondary winding adapted to supply current to the LED light source;
a controller configured to control a load current conducted through the LED light source to control the intensity of the LED light source to a target intensity; and
a current sense circuit configured to receive a sense voltage representative of a magnitude of a primary current conducted through the primary winding, the current sense circuit configured to average the sense voltage when a magnitude of a primary voltage across the primary winding is positive and greater than approximately zero volts to generate a load current control signal that is representative of a real component of the primary current.

17. The LED driver of claim 16, further comprising:
first and second semiconductor switches electrically coupled in series, the first and second semiconductor switches configured to be controlled to generate an inverter voltage at a junction of the first and second semiconductor switches, the junction coupled to the primary winding of the transformer through a capacitor.

18. The LED driver of claim 17, wherein the controller is configured to control the first and second semiconductor switches to cause the primary voltage across the primary winding to have a positive polarity when the first semiconductor switch is conductive and a negative polarity when the second semiconductor switch is conductive, the transformer configured to transfer power to the secondary winding when either of the semiconductor switches is conductive.

19. The LED driver of claim 17, wherein the current sense circuit comprises an averaging circuit configured to average the sense voltage when the first semiconductor switch is conductive to cause the load current control signal to be representative of the real component of the primary current.

20. The LED driver of claim 19, wherein the current sense circuit comprises a third semiconductor switch configured to disconnect the sense voltage from the averaging circuit, the controller configured to render the third semiconductor switch conductive and non-conductive to provide the sense voltage to the averaging circuit when the first semiconductor switch is conductive.

21. The LED driver of claim 20, wherein the controller is configured to render the first semiconductor switch conductive for an on time, and control the third semiconductor switch to provide the sense voltage to the averaging circuit for the on time plus an offset time when the target intensity is less than a threshold intensity.

22. The LED driver of claim 20, wherein the controller is configured render the first semiconductor switch conductive for an on time and control the third semiconductor switch to provide the sense voltage to the averaging circuit for the on time.

23. The LED driver of claim 16, further comprising:
an energy-storage inductor operatively coupled in series with the secondary winding of the transformer, the energy-storage inductor comprising a partially-gapped magnetic core set.

24. The LED driver of claim 16, further comprising:
a sense resistor coupled in series with the primary winding and configured to produce the sense voltage.

* * * * *